United States Patent [19]

Schweikart

[11] 3,826,925

[45] July 30, 1974

[54] SWITCH ARRANGEMENT FOR AN OPTICALLY COUPLED ZERO VOLTAGE SWITCH

[75] Inventor: Horst Schweikart, Offenburg, Germany

[73] Assignee: Gehap Gesellschaft fur Handel und Patent verwertung mbH & Co. KG, Sasbachwalden, Germany

[22] Filed: Nov. 6, 1972

[21] Appl. No.: 304,184

[30] Foreign Application Priority Data

Nov. 5, 1971 Germany.......................... 2154968

[52] U.S. Cl. ................................................ 307/133

[51] Int. Cl. ............................................ H01h 7/16

[58] Field of Search .......... 307/133; 323/16, 17, 18, 323/19, 21, 100

[56] References Cited

UNITED STATES PATENTS

| | | | |
|---|---|---|---|
| 3,381,226 | 4/1968 | Jones et al. | 307/133 |
| 3,450,891 | 6/1969 | Riley | 307/133 |
| 3,693,027 | 9/1972 | Garaway | 307/133 |

*Primary Examiner*—Herman J. Hohauser
*Attorney, Agent, or Firm*—Allison C. Collard

[57] ABSTRACT

A zero voltage switching circuit having a galium arsenide diode on its input terminals optically coupled to a phototransistor. The output of the phototransistor is coupled to the input of a zero voltage switch. The output of the zero voltage switch is coupled to the gate of a triac semi conductor switch so that an A-C power supply applied to the terminals of the triac can be switched at zero voltage.

3 Claims, 2 Drawing Figures

PATENTED JUL 30 1974 3,826,925

SWITCH ARRANGEMENT FOR AN OPTICALLY COUPLED ZERO VOLTAGE SWITCH

Figure 1:
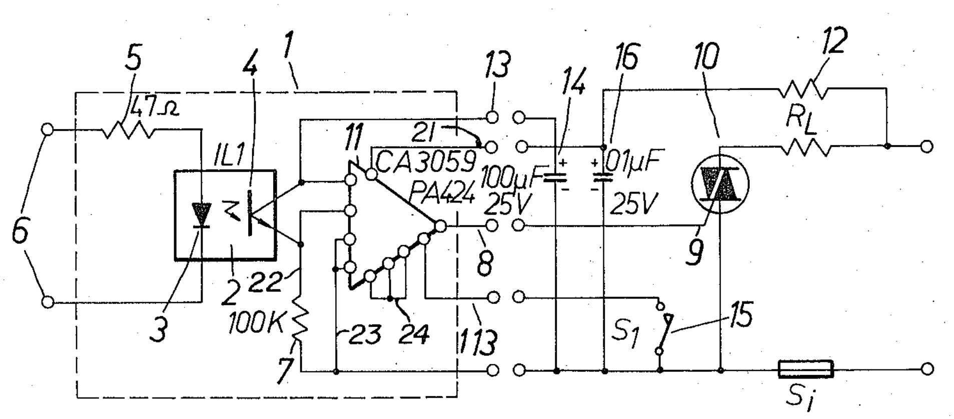

The present invention relates to a switch arrangement for an optically coupled zero voltage switch, for example, for the control of diodes, triacs, or the like.

Switching arrangements are kwown which fire a control diode, such as a triac in the zero voltage position. In this switch arrangement, a special zero voltage switch is used which fires the gate of the Triac when in zero voltage position. According to this invention, a switching arrangement is provided for a zero voltage switch, wherein the control circuit is electrically isolated from the switching circuit. One proposed embodiment suggests a switching arrangement for electrically isolating the control circuit from the switching circuit in that an electronic relay is provided between the switching control and the control circuit. This relay consists of a relay coil having a magnetic field dependent resistor in the range of the magnetic field of the coil. The advantages and disadvantages of such a switch arrangement are known. On the one hand, the switch arrangement has an unlimited life span because no mechanical contacts, such as spring contacts, are provided. On the other hand, the magnetic field dependent resistor is highly temperature sensitive, so that certain provisions have to be made to eliminate temperature fluctuations in the magnetic field dependent resistor.

In the present invention, a switching arrangement for an optically coupled zero voltage switch is provided, wherein the connection for the galium arsenide diode is an integrated switching arrangement of the optically coupled system includes terminals for the control circuit, and the collector of the phototransistor is connected to the input of an integrated zero voltage switch. The emitter is connected to a voltage divider, and the output of the zero voltage switch is connected to the terminals for the gate of a Triac. Further connections are also provided for the A-C power supply. The optically coupled zero voltage switch of the invention has a plurality of advantages. One advantage is that no interference suppressors or screening units are needed since the switching takes place at the zero position of the phase. The control voltage portion of the system is electrically isolated from the switching portion. Thus, the zero voltage switch may be used for resistive loads like heat resistors, lamps, and the like. Another advantage is that no special direct current is needed for activating the zero voltage switch, since an internal rectifier is built into the integrated switching circuit of the zero voltage unit. With this arrangement, it is possible to connect the novel zero voltage switch to a normal alternating current supply through a resistor.

In another embodiment of the invention, a capacitor may be connected between the operating or working resistor and the integrated zero voltage switch, so that the capacitor prevents fluctuations. Therefore, the trigger pulse may be broadened to about 200–300 microseconds. It is, therefore, possible to operate the novel zero voltage switch on inductive loads. It should also be noted that the novel zero voltage switch operates in a broad temperature range of between minus 40°C to 70°C. Since the control circuit is electrically isolated from the switching circuit, the novel zero voltage switch may be used in areas where a high degree of air moisture exists, since no mechanical contacts are provided.

It is therefore an object according to the present invention to provide an optically coupled zero voltage switch for controlling a semi-conductor circuit which is capable of firing the control circuit of a semi-conductor in its zero voltage position.

It is a further object according to the present invention to provide an optically coupled zero voltage switch which is simple in design, easy to construct and reliable in operation.

Other objects and features of the present invention will become apparent from the following detailed description considered in connection with the accompanying drawing which discloses the embodiments of the invention. It is to be understood, however, that the drawing is designed for the purpose of illustration only and not as a definition of the limits of the invention.

Figure 2:
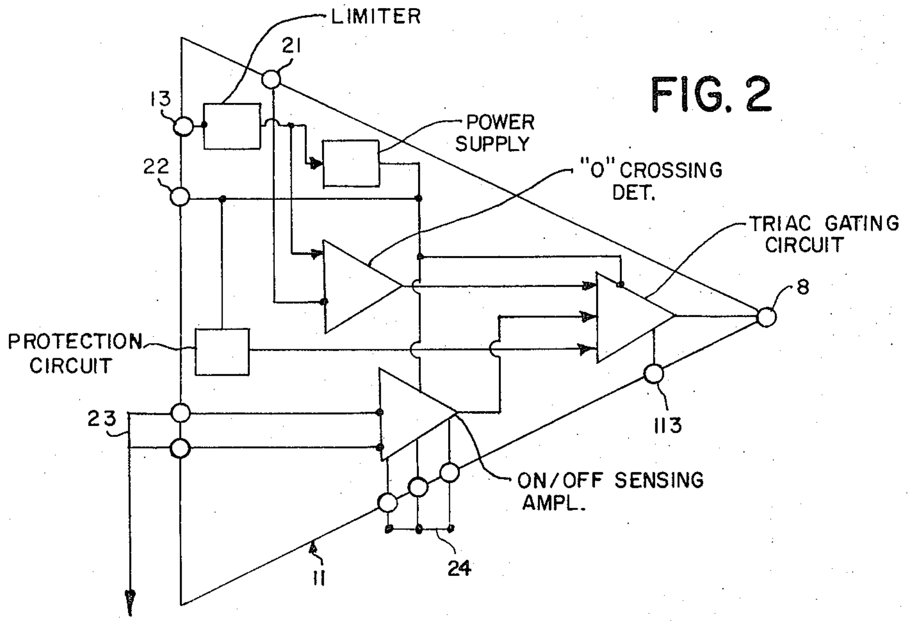

FIG. 1 is a schematic diagram of the switch arrangement according to the invention; and FIG. 2 is a detailed block diagram of the integrated circuit used in FIG. 1.

The switch arrangement in FIGS. 1 and 2 shows the optically coupled zero voltage switch within the dotted line of housing 1, and the load, which is coupled to a Triac. The switching system, in accordance with the invention, consists of an optically coupled system 2, provided with an integrated switching circuit having, for example, a light emitting galium arsenide diode 3 and a phototransistor 4. The connections of the galium arsenide diode are made through a resistor 5 to terminals 6 which are connected to an input signal. The collector of the phototransistor 4 is connected with the input of an integrated switching arrangement of a zero voltage switch type 3059 (PA 424). The emitter of the phototransistor 4 is connected with another input of the zero voltage switch as well as with a voltage divider 7 which is grounded. The output of the zero voltage switch is connected to terminals 8 which leads to gate 9 of the Triac 10. The novel switching arrangement shown in box 1 is also provided with a connection 11 which may be connected to the main current of a resistor 12. A load resistor $R_L$ is switched in the current circuit of Triac 10. The inventive switching arrangement is also provided with a terminal 13, connected to the collector of phototransistor 4. This collector is connected to a capacitor 14 having its other terminal grounded. Capacitor 14 serves to balance the operating current.

Resistor 12 is connected to a further capacitor 16 which is also grounded. Capacitor 16 is designed to broaden the trigger pulse from about 200–300 My sec, so that an inductive load $L_R$ may be triggered. Furthermore, the integrated switching circuit for the zero voltage switch is provided with an additional terminal 13, which may be connected to a switch 15, which serves as a safety switch.

When the switching arrangement is powered, the input circuit may be triggered through resistor 5 directly from a TTL-gauge. It is possible to trigger the input with signals between 1,25 volt and 60 volt. The output pulse is between 2 volt and 100 mA having a pulse width for resistive loads of about 80 My sec.

When a control voltage is provided at input terminals 6, light emitting diode 3 is lighted and produces a current change in phototransistor 4. Phototransistor 4 is connected to zero voltage switch 11 which produces a switching pulse at output 8 only when the alternating current signal applied to input terminal 6 passes through the zero voltage line. With this signal, the gate 9 of Triac 10 is modulated so that the Triac becomes conductive across supply resistor $R_L$. The Triac and the supply resistor are connected to a supply current of, for example, 220 volts AC.

The zero voltage switch 11 triggers Triac 10 only when the AC voltage passes through zero. This has the obvious advantage in that no precuations have to be taken against interferences during switching since the switching is done only during zero voltage. Therefore, pure resistive loads such as heaters or lamps can be switched.

A further advantage of the circuit is that no direct current is required since zero voltage switch 11 includes an internal rectifier. Therefore, it is possible to connect this rectifier directly to the normal current network across resistor 12 as shown in FIG. 1.

Due to the external switching of capacitor 16 through resistor 12, the trigger pulse can be delayed to a width of between 200–300 My seconds, so that it is possible to switch inductive loads. Zero voltage switch 11 carries out the switching of the Triac only during the zero passage of the alternating current signal, by means of the electrically isolated optical coupler 2 so as to obtain the above-mentioned advantages.

In a preferred embodiment of the invention, the following component values were used:

| COMPONENT | COMPONENT RATING |
|---|---|
| Resistor 5 | 47 ohms |
| Resistor 7 | 100K ohms |
| Resistor 12 | 22K ohms, 8 watt |
| Capacitor 14 | 100$\mu$F, 25V. |
| Capacitor 16 | 0.1$\mu$F, 25V. |
| Triac 10 | 1–40 ampere |
| Zero voltage switch | CA3059, PA424 |
| AC power source | 220 volts |

While only a few embodiments of the present invention have been shown and described, it will be obvious that many changes and modifications may be made thereunto without departing from the spirit and scope of the invention.

What is claimed is:

1. A zero voltage switching circuit for switching a power supply to a load circuit comprising:

a galium arsenide diode coupled to the input of the circuit, phototransistor means optically coupled to said diode, zero voltage switch means coupled to the output of said phototransistor means, triac switch means having its input coupled to the output of said zero voltage switch means and having its output in series connection to the power supply and the load circuit so that said triac switch means will connect and disconnect the supply to the load at zero voltage in response to an input signal to said diode.

2. The switching circuit as recited in claim 1, further comprising at least one capacitor coupled to the output of said zero voltage switch means for broadening said output signal for the switching of inductive loads.

3. The switching circuit as recited in claim 2, wherein said zero voltage switch further comprises a safety switch coupled to the output of said zero voltage switch.

* * * * *